B. P. HARRINGTON.
COLD TIRE SETTER.
APPLICATION FILED AUG. 9, 1916.
1,213,099. Patented Jan. 16, 1917.
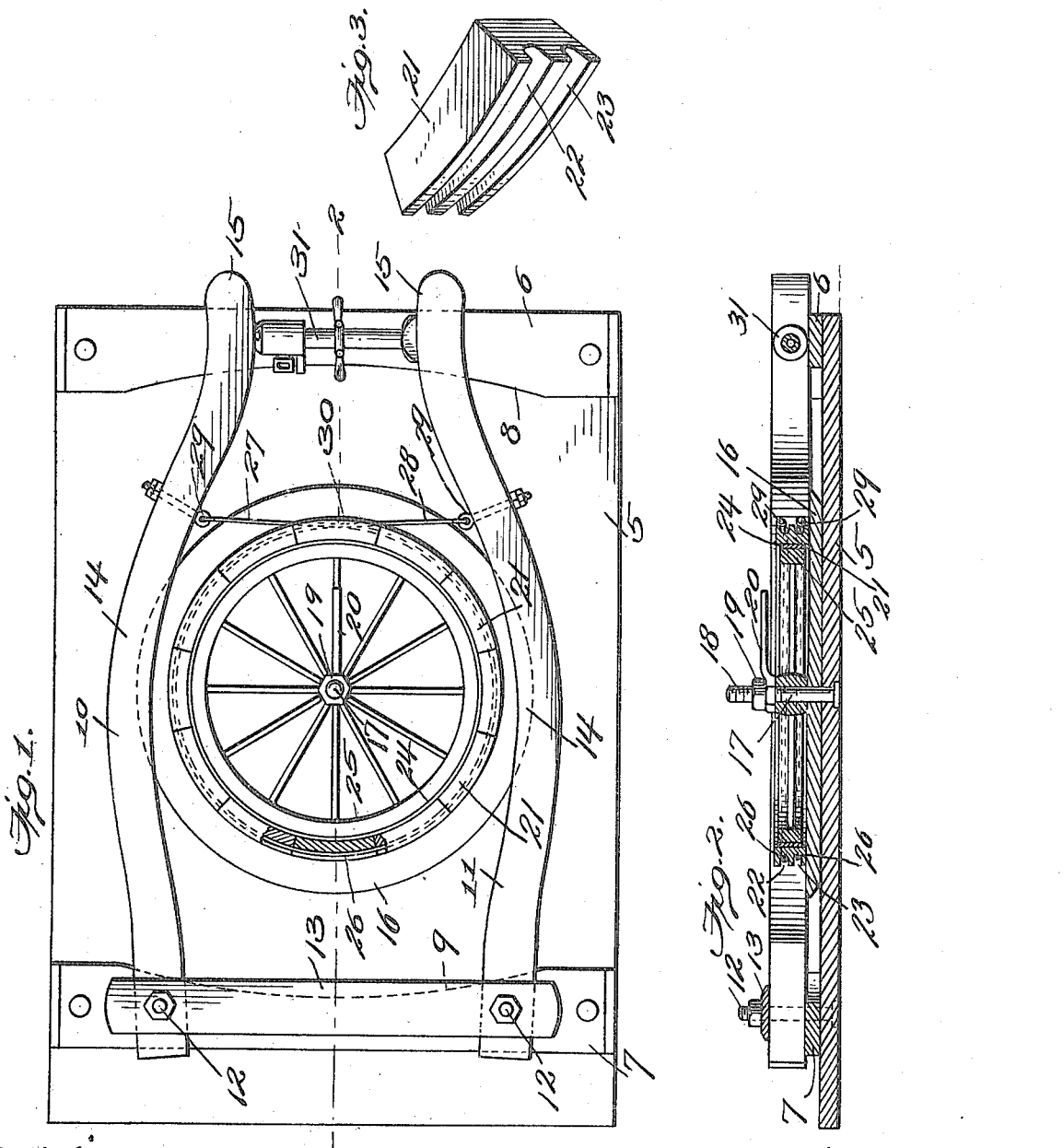
Witnesses:
C. D. Kisler
Chas. S. Hoyer
Inventor
Bryant P. Harrington
by James L. Norris
Attorney

UNITED STATES PATENT OFFICE.

BRYANT P. HARRINGTON, OF MORVEN, GEORGIA, ASSIGNOR OF ONE-HALF TO WILLIAM TURNER GAULDEN, OF QUITMAN, GEORGIA.

COLD-TIRE SETTER.

1,213,099. Specification of Letters Patent. Patented Jan. 16, 1917.

Application filed August 9, 1916. Serial No. 113,918.

*To all whom it may concern:*

Be it known that I, BRYANT P. HARRINGTON, a citizen of the United States, residing at Morven in the county of Brooks and State of Georgia, have invented new and useful Improvements in Cold-Tire Setters, of which the following is a specification.

This invention relates to cold tire setters, and one object of the same is to provide means whereby a tire may be set on a wheel rim without distorting or in any manner injuring the tire and whereby also all parts of the tire will be equally forced against the rim and effectively applied for securement without gripping the edges of the tire by tools, clamps or analogous devices.

A further object of the invention is to overcome the disadvantages and inconveniences incident to common methods of tire shrinking and setting employing heat, and also to minimize the expense, time and labor in practically applying a tire to a wheel rim.

With these and other objects and advantages in view the invention consists in the construction and arrangement of the several parts which will be more fully hereinafter described and claimed.

In the drawing, Figure 1 is a top plan view of a cold tire setter embodying the features of the invention and showing a portion of the tire setting segments in section. Fig. 2 is a longitudinal vertical section taken in the plane of the line 2—2, Fig. 1. Fig. 3 is a detail perspective view of one of the tire setting segments.

The numeral 5 designates a bed or table which may be of wood or other material and adapted to be supported in any suitable manner. Extending across this bed or table are cross-bars 6 and 7 which act as reinforcing means and also as elevated supports for mounting and operating the parts which will be presently described. The inner opposing edges of the cross-bars 6 and 7 are recessed, as at 8 and 9, to give ample clearance on the upper side of the bed or table 5 for operation in setting tires on wheels of various dimensions. Two tension levers 10 and 11 are disposed on the cross-bars 6 and 7, the ends of the tension or setting levers 10 and 11 being fulcrumed on the bar 7 by means of bolts 12 extending through said lever ends and bars 7 and bed 5, as shown by dotted lines in Fig. 2. The tension levers 10 and 11 are reinforced at their fulcrum ends and held down in place against loose movement by a metal bar 13 through which the bolts 12 also extend, the said bar 13 tying the bolts and operating to keep them regularly spaced apart irrespective of the strain that may be imposed thereon through the tension exerted by the levers 10 and 11. The levers 10 and 11 are slightly bowed at the center, as at 14, and have converging free ends 15 which rest on the cross-bar 6. A circular wheel support 16 is mounted on the center of the upper side of the bed or table 5 to support wheels of different dimensions, and extending centrally through the wheel support 16 and through the bed or table 5 is a clamping bolt 17 with an upper screw-threaded extremity 18 engaged by a set nut 19 and also a clamping or hub engaging lever 20 which may be turned down tightly against a wheel hub and secured by the nut 19.

One of the most essential features of the present invention is setting segments 21, all of equal dimensions and preferably formed of metal. Each segment has a pair of longitudinal grooves 22 and 23 in the outer edge thereof, the grooves 22 and 23 becoming continuous when the segments are applied around the tire 24 and wheel 25. These segments may be varied in dimensions in accordance with the dimensions of the wheel rim and tire to be set; and engaging the grooves 22 and 23 is a wire 26 having extremities 27 and 28 respectively connected to the tension levers 10 and 11 by eye-bolts 29, the wire being formed with two coils to engage the grooves 22 and 23 and crossed as shown by dotted lines at 30 in Fig. 1. The coiled wire 26 engaging the grooves 22 and 23 exerts an inward pressure or contraction of the segments 21 relatively to the tire 24 against which the segments are primarily placed with evenness throughout the whole length of the tire, as shown by Fig. 1. The segments 21 are drawn inwardly or contracted against the tire by the expansion of the free extremities 15 of the tension levers 10 and 11, such expansion being effected through the medium of an oil jack 31 of any preferred form, one end of the said jack engaging the inner edge of the free end 15 of the lever 10 and the other end of the jack engaging the corresponding edge of the free end 15 of the lever 11, and by operating this jack in a manner which will be readily understood the free ends or extremities 15 of the levers 10 and 11 will be expanded and thereby exert a drawing tension on the wire extremities 27 and 28 in opposite directions. The opposite pulling tension exerted on the extremities 27 and 28 of the wire 26 will cause the coils of the said wire engaging the grooves 22 and 23 to regularly and evenly shape and press the tire 24 against the wheel rim, and after the tire has been set the expansion of the free ends 15 of the levers 10 and 11 will be relieved by properly operating the oil jack 31, and wire extremities 27 and 28 will as a consequence become slack and reduce the contracting tension on the coils 26 of the said wire and loosen the segments 21 so that the latter may be removed and the wheel with the tire set thereon displaced with relation to the support 16. There should be the same number of segments 21 as there are spokes in the wheel on which the tire is set, twelve segments being shown in the present instance. In applying the segments 21 they are disposed with their centers directly opposite the ends of the spokes to advantageously effect the setting of the tire by inward compression against the resistance provided by the spokes and an even shaping of the tire fully around the wheel rim.

The operation of cold tire setting by the device hereinbefore described, may be expeditiously and effectively carried on, and it will be seen that the structure of the several parts of the device is simple and that they may be easily associated to form a strong and durable means for practically setting a tire without the use of heat or other practices usually adopted.

What is claimed is:

1. In a cold tire setter, the combination of a table having a wheel support thereon, tension arms movably disposed in opposite positions relatively to each other, tire setting segments arranged to circumscribe the tire, flexible means engaging the outer edges of the segments and having the terminals thereof respectively connected to the tension levers, and means for expanding the tension levers and exerting a tension on the said flexible means and the segments.

2. In a cold tire setter, the combination of a table having a wheel support, tension levers arranged at opposite portions of said support, setting segments disposed on the support to equally bear on all portions of the tire to be set and arranged to circumscribe the tire, means connected to the levers and engaging the segments for equally compressing the latter relatively to a tire, and means for expanding the lever to set up a compressing action of the segments.

3. In a cold tire setter, the combination of wheel supporting means, opposed tension levers arranged in operative relation on the wheel supporting means, tire engaging compressing segments primarily loosely arranged in relation to the tire to be set, and means for exerting a tension on the levers and on the said segments.

4. In a cold tire setter, the combination of a wheel support, tension levers disposed in opposite positions relatively to said support, the levers being fulcrumed at one end of each and the opposite ends free, means for engaging the free ends of the levers to expand the latter, a plurality of tire compressing segments arranged on the wheel supporting means primarily in loose condition with relation to the tire to be set, and means connected to the said levers and engaging the segments for equally forcing the latter inwardly against the tire.

5. In a cold tire setter, the combination of a wheel supporting means, a plurality of tire compressing segments arranged to loosely circumscribe a wheel tire and unattached with relation to the supporting means, the said segments completely surrounding the tire to be set, and yielding means passing around and engaging the outer portions of all of the segments and provided with contracting devices connected thereto to effect a uniform pressure of the segments relatively to the tire to be set.

6. In a cold tire setter, a wheel support, opposed tension devices movably arranged in relation to said wheel support, means for expanding the said tension devices, a plurality of tire compressing segments held on the wheel support and arranged to completely circumscribe a wheel tire, the outer edges of the segments being formed with grooves which become continuous when the segments are associated, and a wire coiled in the grooves of the segments and having the extremities thereof respectively connected to the tension devices.

In testimony whereof I have hereunto set my hand in presence of two subscribing witnesses.

BRYANT P. HARRINGTON.

Witnesses:
H. T. REDDICK,
C. G. SCRUGGS.